July 28, 1959 L. HOPPONEN 2,896,245
WINDSHIELD WIPER SYSTEM
Filed Sept. 11, 1957 2 Sheets-Sheet 1
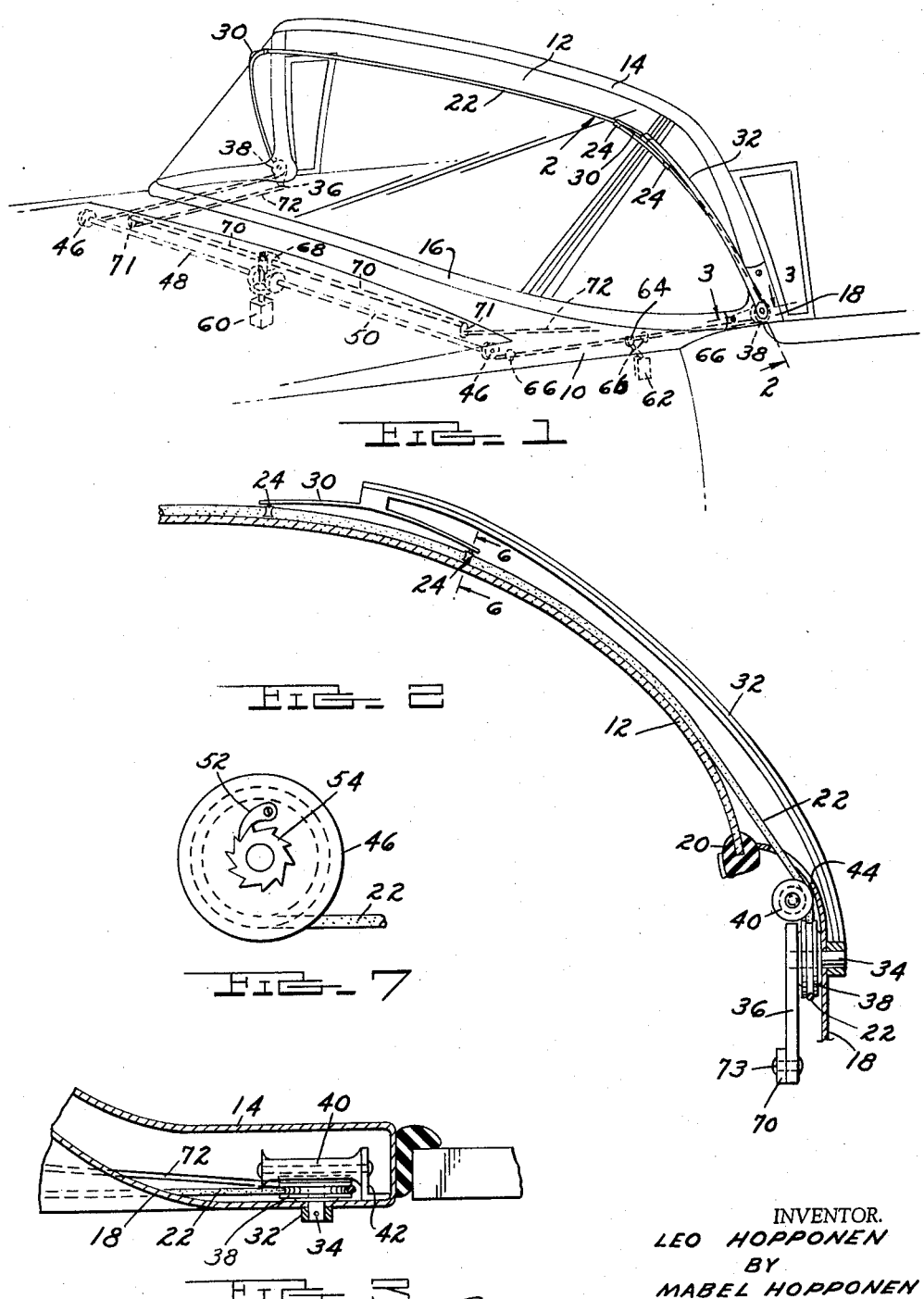
INVENTOR.
LEO HOPPONEN
BY
MABEL HOPPONEN
EXECUTRIX
BY Barnes, Kisselle, Raisch & Choate
ATTORNEYS July 28, 1959    L. HOPPONEN    2,896,245
WINDSHIELD WIPER SYSTEM
Filed Sept. 11, 1957    2 Sheets-Sheet 2
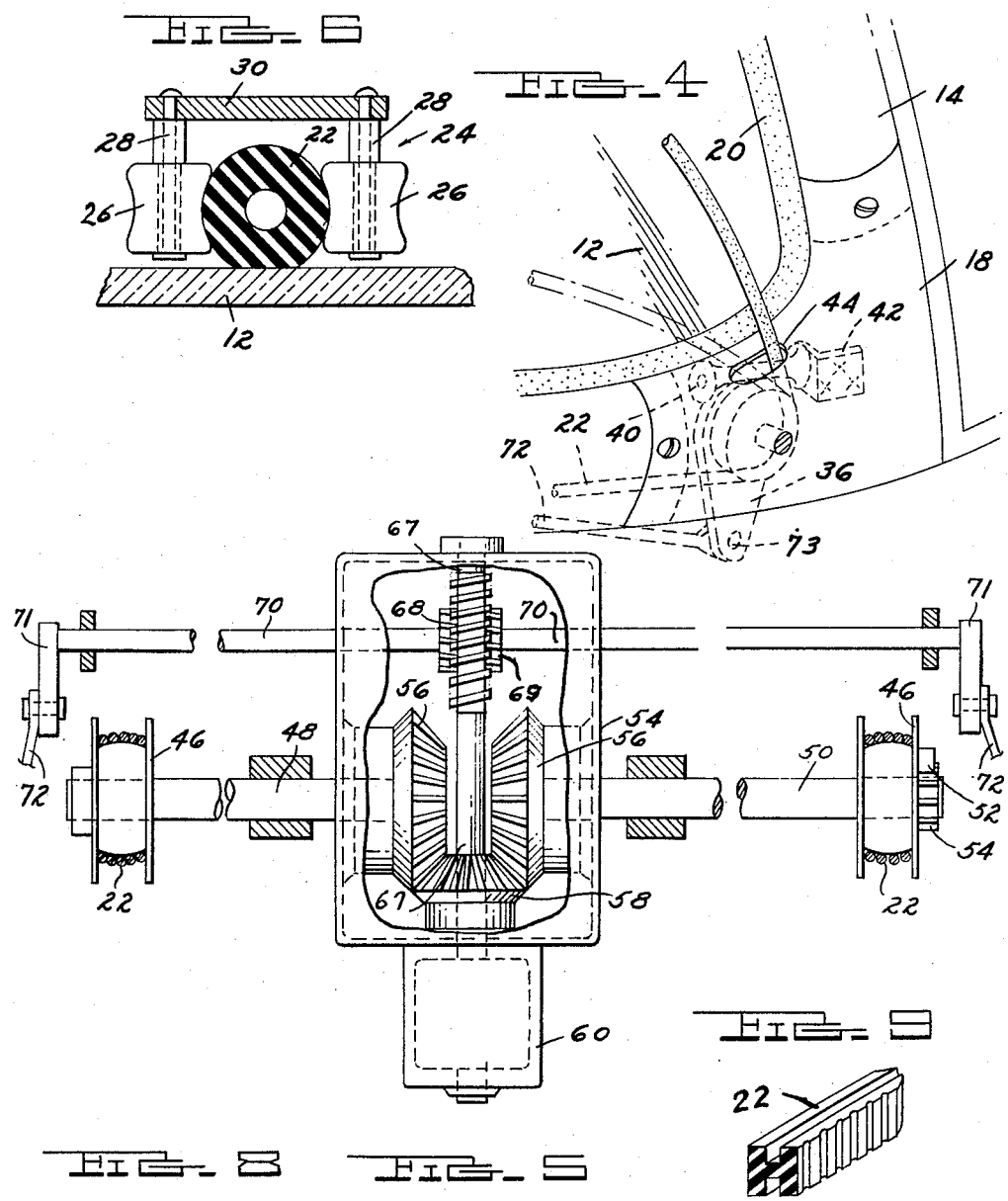
INVENTOR.
LEO HOPPONEN
BY
MABEL HOPPONEN
EXECUTRIX
By Barnes, Kissell, Raisch & Choate
ATTORNEYS

United States Patent Office 2,896,245
Patented July 28, 1959

2,896,245

WINDSHIELD WIPER SYSTEM

Leo Hopponen, deceased, late of Livingston County, Mich., by Mabel Hopponen, executrix, Livingston County, Mich.

Application September 11, 1957, Serial No. 683,386

12 Claims. (Cl. 15—253)

This invention relates to windshield wipers particularly to those designed for use with the wide curved wrap-around windshields, commonly used on modern automobiles, although the invention is adapted for use with other types of windshields and for other vehicles, vessels and craft.

The commonly used squeegee mounted upon an oscillating arm which first found its use with flat windshields has been adapted to the more deeply and compound curved windshields by providing complex flexible supports for the squeegee having sufficient resilience to tend to conform to the changes in curvature as the blade sweeps along its path. These mechanisms are not completely effective, particularly where there is deep compound curvature in the windshield and they, furthermore, introduce added expense, particularly to the part which must be replaced at intervals due to wear.

It is an object of the present invention to provide an improved windshield wiping device which will conform readily to the deepest compound curvatures which may be encountered and reliably wipe the windshield clear under all conditions.

Another object is to provide an improved windshield wiper system in which a single strand of rubber-like flexible material is stretched across the windshield horizontally from side to side and is operated to partake of compound motion including an endwise travel from side to side and a vertical sweep from top to bottom.

Another object is to provide in a windshield wiper of the type described an improved operating mechanism which includes means for moving the strand in an endwise direction together with guide means for establishing the path of endwise travel and, in addition, to provide means for shifting the guide means up and down in front of the windshield.

Further objects and advantages of the present invention will be apparent from the following description, reference being had to the accompanying drawings wherein a preferred form of the present invention is illustrated.

In the drawings:

Fig. 1 is a perspective view of a vehicle cowl and windshield incorporating a preferred form of the present invention.

Fig. 2 is a sectional view taken on line 2—2 of Fig. 1.

Fig. 3 is a sectional view taken on line 3—3 of Fig. 1.

Fig. 4 is a fragmentary view perspective of the lower corner of the windshield with a portion of the mechanism broken away.

Fig. 5 is a view partly in section of a portion of the operating mechanism.

Fig. 6 is a sectional view taken on line 6—6 of Fig. 2.

Fig. 7 is a fragmentary view of a portion of the operating mechanism.

Figs. 8 and 9 are modified strand configurations.

Referring now to Fig. 1, there is shown a portion of a vehicle including a cowl structure 10 to which is secured a wrap-around windshield 12 having upper and lower frame channels 14 and 16, which are joined by a corner plate 18. Conventional channel strips 20 formed of rubber provide a sealing mount for the windshield proper, within the frame (Fig. 4).

The wiper element comprises a single strand 22 of rubber-like plastic material and is preferably in the form of a tube, although other sectional configurations may be used. (See Figs. 8 and 9.) The wiper strand 22 is stretched across the front of the windshield and passes through guides 24 which are shown in detail in Fig. 6. These may comprise a pair of hour-glass rollers 26 positioned on pivots 28 which are secured to a blade 30. Two blades 30 may be provided, one at each shoulder of the wrap-around windshield and each blade preferably carries a pair of guides 24.

The blades 30 are carried by oscillatable arms 32 which are pivoted near the lower rear corner of the windshield 12 upon a stub axle 34. The latter is journalled in the corner plate 18 and carries at its inner end an operating arm 36. The shaft 34 also carries freely rotatable thereon a pulley 38 around which the strand 22 is reeved. A spool guide 40 is mounted on a bracket 42 beneath an aperture 44 formed in the corner plate 18. The strand 22 passes through the aperture 44 and is guided on to the pulley 38 by the spool 40.

The strand 22 is subjected to an endwise motion by a wind-and-rewind mechanism positioned under the cowl 10. For this purpose, a pair of reels 46 are located immediately under the cowl and near the sides of the vehicle (Fig. 5.) The left hand reel 46 in Fig. 5 is secured to the end of a shaft 48 and has wound thereon one end of the strand 22. The other reel 46 is rotatable on a shaft 50 and connected thereto through the medium of a pawl 52 and a ratchet 54 which is secured to the shaft 50. The pawl and ratchet enable the strand 22 to be tightened so as to remove all slack.

The shafts 48 and 50 have their inner ends positioned in a gear box 54 within which is mounted a pair of bevel gears 56 which mesh with a bevel pinion 58. The pinion 58 is driven by a reversible electric motor 60 mounted under the cowl 10 and carrying the bevel gear box 54 upon its end.

A reversing switch 62 is mounted adjacent one run of the strand 22 and has an operating arm 64 positioned adjacent the strand 22 for operation by enlarged abutments 66 secured to the latter. For the purpose of oscillating the arms 32, motor shaft 67 is extended and carries a worm 68 which drives a gear 69 on a shaft 70. Crank arms 71 on the shaft 70 actuate links 72 which are connected by a pivot 73 to the arms 36. The throw of the crank can be adjusted by the connection of arm 72 to the crank 71.

In operation, starting with the parts in the position shown in Fig. 1 and with the main control switch, not shown, turned on to energize the motor 60, the shafts 48 and 50 are rotated in opposite directions through the bevel gearing 56 and 58. The direction of rotation is such as to pull the strand 22 across the windshield 12 from left to right. The shaft 70 at the same time causes oscillation of the arms 32 through linkage 72, arms 36 and shafts 34. Thus, the guides 24 are moved up and down along the shoulder of the windshield 12 causing the strand 22 to sweep the full width of the windshield from substantially the top to substantially the bottom. The worm gear is pitched to cause a quarter turn of shaft 70 to a full sweep of the strand (4 or 5 turns) on the reels 46.

As the strand 22 is unwound from the reel 46 on the driver's side, the forward one of the enlargements 66 actuates lever 64 and reversing switch 62. This causes motor 60 to reverse, thus reversing the endwise movement of strand 22 and the direction of shaft 70. It will be understood that the reversing abutments 66 may be more widely spaced than appears on the drawing and that the amount of endwise travel of the strand 22 which occurs between reversals may be as short or as long as desired. In fact, in some installations, it may be desirable to provide for endwise travel of the strand continuously in one direction by reeving it through a suitable pair of continuously operating pinch rolls or by reeving a few turns around a suitable continuous revolving drum.

It will thus be seen that the present invention provides an improved windshield wiper which covers substantially the entire area of the windshield. In addition, the endwise travel of the strand 22 which is superimposed upon its vertical sweep produces a resultant motion of any single portion of the strand 22 which is on a diagonal path. This tends, by viscous adhesion, to carry accumulated water to the side of the windshield and greatly assists in preventing accumulation of water or rain drops in the central portion of the windshield.

While the form of embodiment of the invention as herein disclosed constitutes a preferred form, it is to be understood that other forms might be adopted, all coming within the scope of the claims which follow.

What is claimed is as follows:

1. A windshield wiper comprising a strand of flexible material arranged horizontally of a vehicle windshield, a shiftable guide means for the strand, means for shifting the guide means through alternately reversible up and down sweeps to cause the strand to traverse the windshield vertically and means for pulling the strand endwise through the guide concurrently with the up and down sweeps whereby a diagonal wiping action is produced.

2. A windshield wiper comprising a strand of flexible material arranged horizontally of a vehicle windshield, a shiftable guide means for the strand, means including an oscillating arm for shifting the guide means through alternately reversible up and down sweeps to cause the strand to traverse the windshield vertically and means for pulling the strand endwise through the guide concurrently with the up and down sweeps whereby a diagonal wiping action is produced.

3. A windshield wiper comprising a strand of flexible material arranged horizontally of a vehicle windshield of the type having a main portion with relatively little curvature and integral side portions curved rearwardly and tapered to substantially a point at the rearmost corner, a shiftable guide means for the strand, means including an arm pivoted adjacent said point for shifting the guide means through alternately reversible up and down sweeps to cause the strand to traverse the windshield vertically and means for pulling the strand endwise through the guide concurrently with the up and down sweeps whereby a diagonal wiping action is produced.

4. A windshield wiper comprising a strand of flexible material arranged horizontally of a vehicle windshield of the type having a main portion with relatively little curvature and integral side portions curved rearwardly and tapered to substantially a point at the rearmost corner, a shiftable guide means for the strand, means including an arm pivoted adjacent said point for shifting the guide means through alternately reversible up and down sweeps to cause the strand to traverse the windshield vertically and means for pulling the strand endwise through the guide concurrently with the up and down sweeps whereby a diagonal wiping action is produced, said last named means including at least one motor driven pulley.

5. A windshield wiper comprising a strand of flexible material arranged horizontally of a vehicle windshield of the type having a main portion with relatively little curvature and integral side portions curved rearwardly and tapered to substantially a point at the rearmost corner, a shiftable guide means for the strand, means including an arm pivoted adjacent said point for shifting the guide means through alternately reversible up and down sweeps to cause the strand to traverse the windshield vertically, means disposed inwardly of the vehicle body for pulling the strand endwise through the guide concurrently with the up and down sweeps whereby a diagonal wiping action is produced, a pulley coaxial with the pivot of the arm and means forming an aperture in the body adjacent the last named pulley for passing the strand between the inside and outside of the vehicle.

6. A wiper for a curved wrap-around windshield comprising a flexible strand of plastic material extending horizontally across the windshield from side to side, means for moving the strand endwise along the surface of the windshield, a guide for determining the path of endwise travel and means for moving the guide upwardly and downwardly along the windshield surface.

7. A wiper for a curved wrap-around windshield comprising a flexible strand of plastic material extending horizontally across the windshield from side to side, means for moving the strand endwise along the surface of the windshield, a guide for determining the path of endwise travel and means for moving the guide upwardly and downwardly along the windshield surface including a pair of arms pivoted near the extreme rear lower corner of the windshield and extending toward the mid-portion of the windshield and means for oscillating said arms asymmetrically in synchronism.

8. A wiper for a curved wrap-around windshield comprising a flexible strand of plastic material extending horizontally across the windshield from side to side, means for moving the strand endwise along the surface of the windshield, a guide for determining the path of endwise travel, means for moving the guide upwardly and downwardly along the windshield surface including a pair of arms pivoted near the extreme rear lower corner of the windshield and extending toward the mid-portion of the windshield, means for oscillating said arms asymmetrically in synchronism and a common motor for driving the strand moving means and the arm oscillating means.

9. A wiper for a curved wrap-around windshield comprising a flexible strand of plastic material extending horizontally across the windshield from side to side, means including a pair of reels for moving the strand endwise along the surface of the windshield, a guide for determining the path of endwise travel, means for moving the guide upwardly and downwardly along the windshield surface including a pair of arms pivoted near the extreme rear lower corner of the windshield and extending toward the mid-portion of the windshield and means including a pair of cranks and connecting rods for oscillating said arms asymmetrically in synchronism.

10. A wiper for a curved wrap-around windshield comprising a flexible strand of plastic material extending horizontally across the windshield from side to side, means including a pair of reels for moving the strand endwise along the surface of the windshield, a guide for determining the path of endwise travel, means for moving the guide upwardly and downwardly along the windshield surface including a pair of arms pivoted near the extreme rear lower corner of the windshield and extending toward the mid-portion of the windshield, means including a pair of cranks and connecting rods for oscillating said arms asymmetrically in synchronism, a common motor for driving the reels and the cranks and means for reversing the motor.

11. A wiper for a curved wrap-around windshield comprising a flexible strand of plastic material extending horizontally across the windshield from side to side, means including a pair of reels for moving the strand endwise along the surface of the windshield, a guide for determining the path of endwise travel, means for moving the guide upwardly and downwardly along the windshield surface including a pair of arms pivoted near the extreme rear lower corner of the windshield and extending toward the mid-portion of the windshield, means including a pair of cranks and connecting rods for oscillating said arms asymmetrically in synchronism, a common motor for driving the reels and the cranks and means controlled by the endwise motion of the strand for reversing the motor.

12. A wiper for a curved wrap-around windshield comprising a flexible strand of plastic material extending horizontally across the windshield from side to side, means including a a pair of reels for moving the strand endwise along the surface of the windshield, a guide for determining the path of endwise travel, means for moving the guide upwardly and downwardly along the windshield surface including a pair of arms pivoted near the extreme rear lower corner of the windshield and extending toward the mid-portion of the windshield, means including a pair of cranks and connecting rods for oscillating said arms asymmetrically in synchronism, a common motor for driving the reels and the cranks and means controlled by the endwise motion of the strand for reversing the motor, said motor reels and cranks being positioned forward of the windshield and below the same.

References Cited in the file of this patent

UNITED STATES PATENTS

| | | |
|---|---|---|
| 2,399,652 | Rappl | May 7, 1946 |
| 2,412,850 | Whitted | Dec. 17, 1946 |
| 2,593,073 | Trevaskis | Apr. 15, 1952 |
| 2,607,944 | Turner | Apr. 26, 1952 |
| 2,615,190 | Shaw | Oct. 28, 1952 |
| 2,629,891 | Greene | Mar. 3, 1953 |
| 2,759,213 | Trotta | Aug. 21, 1956 |

FOREIGN PATENTS

| | | |
|---|---|---|
| 662,718 | Germany | June 23, 1938 |